Feb. 13, 1923.
C. OERTLI.
REPLACEABLE BEARING.
FILED SEPT. 5, 1922.
1,445,408.
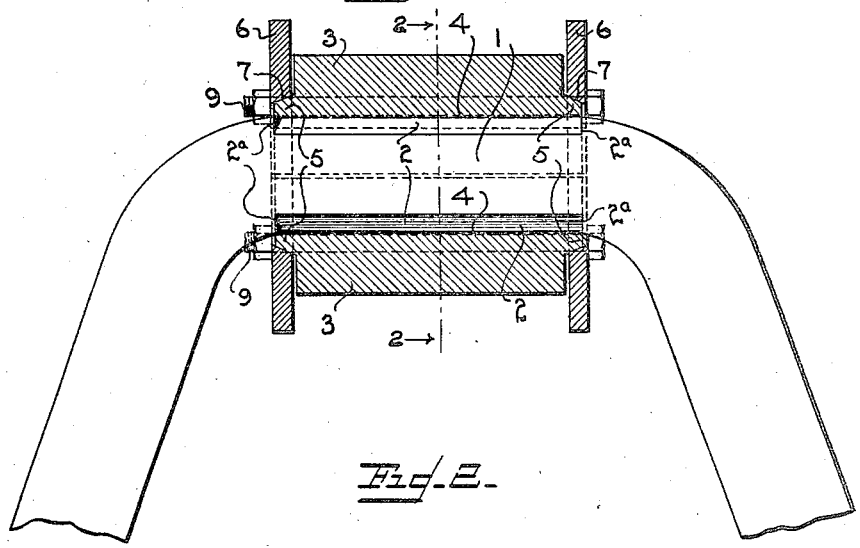
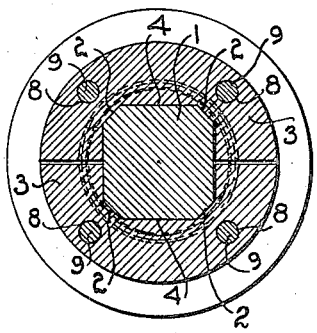
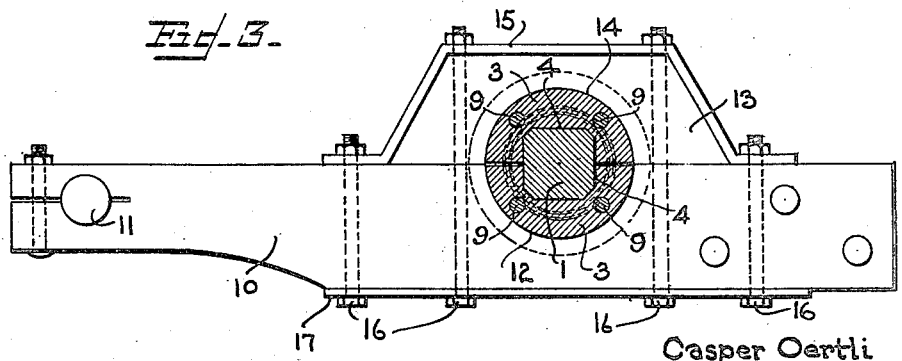
Casper Oertli
INVENTOR Patented Feb. 13, 1923.

1,445,408

UNITED STATES PATENT OFFICE.

CASPER OERTLI, OF HAMILTON, MONTANA.

REPLACEABLE BEARING.

Application filed September 5, 1922. Serial No. 586,229.

*To all whom it may concern:*

Be it known that I, CASPER OERTLI, a citizen of the United States, residing at Hamilton, in the county of Ravalli and State of Montana, have invented a new and useful Replaceable Bearing, of which the following is a specification.

This invention relates to replaceable bearings, and the prime object is to provide simple and efficient means for overcoming the uneven strains and wear that the crank shaft is subjected to, the invention being especially designed for use in connection with the crank shafts of self feeders of threshing machines and in other agricultural machinery, where the wear on ordinary bearings takes place all on one side.

The object is to provide a bearing for such use which may readily be turned to present a new surface to the point of strain and wear without the necessity for dismantling the machine, or taking out the entire crank, as is necessary in the use of said ordinary bearings, the invention comprising a pair of co-acting, similar bearing blocks capable of being quickly applied in surrounding relation to the crank, and having means for tightly clamping the same in position, the parts having such engagement with the said crank as to prevent any side movement of the same longitudinally of the crank proper.

A further object is to provide such a bearing that may be manufactured at a low cost, the use of which will eliminate the necessity for replacing the entire crank shaft when worn, the changing of the bearing members being capable of accomplishment while the machine is in the field, and without the necessity for special tools or any great skill to accomplish the same.

A full and complete understanding of the invention may be obtained from a consideration of the following detailed description, taken in connection with the accompanying drawing forming a part of this specification; it being understood that while the drawing shows a practical form of the invention, the latter is not confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:—

Figure 1 is a longitudinal sectional view through the improved bearing and showing the same applied to a crank shaft;

Figure 2 is a transverse sectional view, taken on the line 2—2 of Figure 1;

Figure 3 is a view similar to Figure 2, but drawn on a smaller scale, and showing the connection of the crank and bearing to an actuating pitman such as is used in self feeders of threshing separators.

Referring to the drawing there is illustrated a crank 1 comprising a portion of a shaft, such as hereinbefore mentioned, and while such shafts are generally square in cross section, as shown, it is to be understood that the invention may be used with equal advantage on round shafts, as will be readily understood.

The bearing portion of the crank 1, to which the pitman or other operating part of the machine may be connected, has the corners beveled, as at 2, said beveled portions extending throughout the major portion of the crank bearing, thus providing abrupt shoulders $2^a$ at each end of the bevels, for a purpose to be explained. A pair of co-acting metal blocks 3 are adapted to be placed around the bearing portion of the crank 1, the ends of the blocks fitting snugly between the shoulders 3 to be held thereby from any lengthwise movement of the same on the bearing of the crank, and each block is provided with a longitudinally disposed recess 4 therein, and conforming to one-half of the said bearing, the abutting faces of the two blocks being slightly spaced apart when the same are applied in position.

The ends of the blocks are each provided with conical extensions 5 having their inner faces conforming to and co-extensive with the recesses 4, and their outer peripheries semi-circular in form, so that the two members when applied in position, provide a substantially circular extension at each end, to which are adapted to be applied a pair of spaced metal washers 6, each being round on its outer periphery, and having a round opening 7, at its center for the reception of the extensions, the walls of the opening 7 being tapered to conform to the conical extensions, and being of a diameter slightly less than the outer diameter of said extension, so that when the said washers are drawn toward each other, by means to be described, the action of the openings 7 on the conical extensions, will tend to clamp the members 3 tightly around the bearing portion of the crank, when the inner faces of the said washers will still be in slightly spaced relation to the ends of the blocks 3.

Each block 3 is provided with a pair of spaced bores or passageways 8 arranged longitudinally thereof and in radial alinement with the corners formed in their recesses 4, thus providing four equally spaced passageways for four tie bolts 9, which also traverse suitably alined openings in the end washers 6, and have the usual bolt heads and nuts to draw the same up for forcing the washers together to clamp the blocks 3 tightly about the bearing portion of the crank 1.

As illustrated in Figure 3, a pitman 10, having suitable connection at one end to a wrist pin 11, is provided at the other end with a semi-circular seat 12 to receive one of the blocks 3, said pitman being usually formed of hard wood, and having a similar wooden block 13 mounted on one face thereof, and provided with a corresponding semi-circular seat 14 to receive the other block 3, an angularly bent strap iron 15 surrounding the last named wooden block and having suitable apertures for the passage of bolts for securing the two wooden members together, another strap iron 17 being placed at the opposite face of the pitman 10 to receive the heads of the bolts 16, and thus providing the necessary strength and rigidity to the pitman. Any other use for the improved bearing may however, be made, as the same is admirably adapted for use in any location where a powerful end thrust is imparted to the crank, thus causing undue wear at one point of the bearing.

When the outer peripheries of the semi-circular blocks 3 become worn by excessive use, it is only necessary to release the nuts of the bolts 9 and then remove said bolts, after which the washers 6 may be slid off of the conical extensions 5 of the blocks 3, when the latter may be removed from the crank to be replaced by new and unworn ones if necessary, or to turn the said blocks around one quarter of a turn to be applied to the next adjacent face of the rectangular bearing portion of the crank, and the washers and bolts re-applied in the manner described.

From the foregoing it will be seen that a simple, cheaply-manufactured and easily applied replaceable bearing for the purposes specified, has been provided, which may be quickly changed or adjusted while in the field, and without the necessity for special tools or skill, and which will add to the life of the crank and pitman of self feeders for threshing separators or other machinery.

What is claimed is:

1. A replaceable bearing for cranks, comprising a sleeve formed of two similar members, each member having a longitudinal recess to fit over substantially one half of the bearing portion of the crank, conical, semi-circular extensions formed on each end of the members and constituting a complete circle when in position on the crank, means for preventing longitudinal movement of the members thereon, end washers applied on the crank at each end of the members and having openings tapered to fit the said extensions, each member having spaced longitudinal holes, the washers having similar holes alining therewith, and bolts traversing the alined holes to draw the washers together and force the members into clamping engagement with the crank, by the action of the tapered openings in the washers on the conical extensions.

2. A replaceable bearing for cranks comprising a sleeve formed of two similar members, each member having a longitudinal recess to fit over substantially one-half of the bearing portion of the crank, the crank being square in cross section and the recess being shaped to correspond therewith, conical extensions formed on the ends of the members, means for preventing longitudinal movement of the members on the crank, end washers applied to the crank at each end of the members and having tapered openings to fit the said extensions, and bolts passed through the members and engaging the washers to force the members into clamping engagement with the crank.

3. A replaceable bearing for cranks, comprising a plurality of members, each member having a longitudinal recess to embrace a section of the bearing portion of the crank and having tapered ends, means for preventing longitudinal movement of the members on the crank including a washer on each of the tapered ends, said washers extending outwardly beyond the bearing surface of the bearing members to provide retaining flanges for the connecting rod, and bolts passed through said members and connecting the washers.

4. The combination with a shaft having a crank portion non-circular in cross section, of a replaceable bearing adapted to be mounted on said crank portion, said bearing being divided longitudinally into a plurality of sections and having tapered ends, washers on said tapered ends and forming side flanges for retaining the connecting rod, and means for drawing the washers toward each other to exert a wedging action against the sections.

In testimony that I claim the foregoing as my own, I have hereto affixed my signature.

CASPER OERTLI.